United States Patent [19]

Henkel et al.

[11] Patent Number: 4,574,111

[45] Date of Patent: Mar. 4, 1986

[54] ELECTRIC INSULATION

[75] Inventors: Hans-Joachim Henkel; Norbert Müller, both of Erlangen, Fed. Rep. of Germany

[73] Assignee: Siemens Aktiengesellschaft, Munich, Fed. Rep. of Germany

[21] Appl. No.: 750,061

[22] Filed: Jun. 28, 1985

Related U.S. Application Data

[63] Continuation of Ser. No. 616,694, Jun. 4, 1984, abandoned.

[30] Foreign Application Priority Data

Jun. 13, 1983 [DE] Fed. Rep. of Germany ....... 3321268

[51] Int. Cl.$^4$ .............................................. B32B 15/08
[52] U.S. Cl. ..................................... 428/461; 428/462; 428/463; 524/381; 174/110 SR; 174/110 PM; 174/110 V
[58] Field of Search ............... 428/379, 461, 462, 463; 524/381; 174/110 SR, 110 PM, 110 V

[56] References Cited

U.S. PATENT DOCUMENTS

| 3,067,155 | 12/1962 | Michaels | 524/381 |
| 3,361,729 | 1/1968 | Takashima et al. | 524/381 |
| 4,104,247 | 8/1978 | Kato et al. | 524/381 |
| 4,144,202 | 3/1979 | Ashcraft | 252/63.2 |
| 4,206,260 | 6/1980 | McMahon | 428/461 |
| 4,212,756 | 7/1980 | Ashcraft | 252/63.2 |
| 4,263,158 | 4/1981 | Ashcraft | 252/573 |
| 4,282,333 | 8/1981 | Irie | 525/6 |
| 4,299,713 | 11/1981 | Maringer et al. | 174/110 SR |
| 4,369,331 | 1/1983 | Keogh | 174/110 PM |

FOREIGN PATENT DOCUMENTS

| 2425760 | 1/1975 | Fed. Rep. of Germany . |
| 2537283 | 3/1977 | Fed. Rep. of Germany . |
| 2817801 | 9/1978 | Fed. Rep. of Germany . |
| 2754336 | 7/1979 | Fed. Rep. of Germany . |
| 2805875 | 8/1979 | Fed. Rep. of Germany . |

OTHER PUBLICATIONS von Wanswer et al., Kabelisolierungen aus Kunststoff, Kunststoffe 71 (1981) pp. 448-453.

Primary Examiner—Lewis T. Jacobs
Attorney, Agent, or Firm—Kenyon & Kenyon

[57] ABSTRACT

The invention relates to electric insulation of polyolefin suitable for medium and high voltage from about 10 kV which resists the formation of so-called water trees. For this purpose, the insulation contains as an additive at least one alcoholate of magnesium, calcium or aluminum. The electric insulation according to the invention is particularly suitable for use in cables and wires.

4 Claims, No Drawings

ELECTRIC INSULATION

This application is a continuation of application Ser. No. 616,694, filed June 4, 1984, now abandoned.

BACKGROUND OF THE INVENTION

The invention relates to an electric insulation composed of polyolefin containing an additive for preventing the formation of water trees. It is especially useful in cables and wires for medium and high voltage from about 10 kV on.

In electrically stressed polyolefin insulation, processes can occur which are called "electrochemical treeing" (ECT) or "water treeing". These processes, which are of importance particularly in view of the operating safety of plastic-insulated medium and high voltage cables, lead to the development of tree-like structures, the so-called ECT structures.

The visual appearance of ECT structures which, after suitable staining, are visible, varies greatly. In principle, two forms are distinguished:

"vented trees" which start from the surface of the insulation and extend into the insulation, and "bow-tie trees", which are generated in the interior of the insulation.

The mechanism of the ECT development has not yet been clarified to date. However, it is generally assumed that an electric field and the presence of a polar liquid, particularly water, are required for the formation of the ECT structures; the latter are therefore also called water trees. The initiation points of the water trees seem to be faults such as impurities, aggregrated admixtures, voids, gaps, cracks or boundary surfaces, which however only partially lead to the formation of water trees. Starting from the faults which, in insulation produced on a mass scale cannot be avoided completely, the tree-like structures extend in the direction of the electric field.

Since ECT structures represent local changes of the insulating material, they can cause damage to the insulation especially with respect to the dielectric strength. Numerous experiments have therefore been undertaken to prevent or at least delay the growth of water trees.

One of the measures for preventing the formation of water trees consists of providing the insulation layer with a metallic enclosure or jacket, for instance, of lead or aluminum. However, cables with such a water shielding layer are not only more expensive but are also heavier and therefore, more difficult to handle than cables without metal jackets.

For this reason, it has been attempted to prevent the formation of ECT structures by admixing additives to the insulation layer (or adjoining layers). Among the large number of compounds used in this connection are: lead stearate (DE-OS No. 24 25 760 or British Pat. No. 1,473,867), sodium chloride and sodium sulfate or other strong electrolytes (DE-AS No. 25 37 283 or U.S. Pat. No. 4,042,776), salts forming stable hydrates such as calcium and magnesium chloride, and basic anhydrides (DE-OS No. 28 17 804 or British Pat. No. 1,584,501), silica gel and phosphorous pentoxide (DE-OS No. 27 54 336), organosilanes (U.S. Pat. Nos. 4,144,202; 4,212,756; and 4,263,158 as well as DE-OS No. 28 05 875) lead oxides and basic lead compounds (DE-OS No. 25 23 844 and DE-OS No. 28 06 752), organic isocyanates (U.S. Pat. No. 4,282,333) silane compounds grafted on the polymer material (DE-OS No. 29 35 224) and metal complexes of diketones, salicylic acid or Schiff bases (European Pat. No. A1-0 027 300).

On the other hand, and contrary to the proposals to add salt-like compounds or electrolytes, it has been proposed to keep the content in the insulation of finely distributed water-soluble and/or hydroscopic salts below a value of $10^{-1}$ ppm and preferably below $10^{-4}$ ppm (DE-OS No. 29 11 756: page 3, paragraphs 3 and 4).

These measures, which partly contradict each other, have not had much success because as reported by the International High-Voltage Conference of 1980, (see "Kunststoffe" 71, 1981, page 448 ff, especially page 450 to page 451), it was recommended to apply a water-tight metal shield to (high-voltage) cables in order to prevent the penetration of moisture.

It is an object of the invention, therefore, to prevent effectively and permanently in polyolefin electric insulation, the formation of water trees by use therein of suitable additives so that expensive measures such as metal jackets can be dispensed with.

SUMMARY OF THE INVENTION

According to the invention, there has been developed an electric insulation compound of a polyolefin which contains as an additive at least one alcoholate of magnesium, calcium or aluminum. This composition resists the formation of water trees.

The metal alcoholates (of Mg, Ca and Al) used according to the invention are hydrolyzable compounds having the following structure: $Mg(OR)_2$, $Ca(OR)_2$ and $Al(OR)_3$, where R is an alkyl, cycloalkyl or alkaryl organic radical derived from the corresponding alkyl, cycloalkyl or alkaryl alcohol (ROH). The radical R, which can be the same or different in the alcoholate, is preferably alkyl of 1 to 24 carbons, cycloalkyl, particularly cyclohexyl, or alkaryl such as benzyl.

DETAILED DESCRIPTION

Use of the additives according to the invention suppresses the ETC formation in electric insulating materials and increases the supply of effective additives. Until the present invention, the only compounds used for this purpose were barbituric acid or 2-thiobarbituric acid and derivatives thereof (DE-OS No. 32 02 828), water-soluble alkali or earth alkali phosphates and hydrolyzable phosphoric-acid esters (DE-OS No.32 02 896) as well as substances with a defined particle size which are absorption-active for heavy metal ions or bind heavy metals in an ion exchange such as pyrogenic and/or precipitated silicic acid as well as aluminum oxides or aluminum oxide hydrates and aluminum silicates (German Patent Application File No. P 33 18 988.9- VPA 83 P 3159 DE).

From European Patent Application A2-0 057 286, a composition is known which has no added mineral filler and contains an ethylene polymer and an organotitanate in an amount sufficient to improve the ECT resistance. The effect of the titanate $Ti(OR)_4$ is explained by the fact that it is hydrolyzed and in the process furnishes an alcohol; the alcohol functions as an inhibitor of the formation of water trees. The titanates are therefore a kind of depot form for the ECT-inhibitor alcohol.

In contrast in the insulation according to the invention the hydroxides (of Mg, Ca and Al) generated from the alcoholates by hydrolysis assume decisive importance. These hydroxides presumably colloidally enclose impurities present in the insulation which cause the formation of ECTs and therefore prevent the ECT formation. It has now been shown surprisingly that this effect is obtained if alcoholates of metals of the second and third main group of the periodic system of the elements are used.

In addition to cables and wires, the electrical insulation according to the invention can also be used in bushings and in fittings. In these insulating materials, polyolefins serve as the basic material, and more specifically, cross-linked or linear materials. In the insulation according to the invention, polyethylene (PE) and cross-linked polyethylene (VPE) are preferred. In addition ethylene copolymers such as ethylene-propylene copolymers (EPR), ethylene-vinylacetate copolymers (EVA) and ethylene alkylacrylate copolymers such as ethylene-ethylacrylate and butylacrylate copolymers can be used or ethylene-propylene-diene terpolymers and mixtures (blends) of these ethylene copolymers and terpolymers with polyolefins especially polyethylene and polypropylene can be used. The mentioned polymers or polymer mixtures may be cross-linked as already mentioned, as well as linear. The cross-linking is preferably accomplished here peroxidically or by high-energy radiation. Optionally, the insulating materials can also be provided with oxidation stabilizers.

The content of the additives is approximately between 0.05 and 10% by weight, relative to the total weight of the electric insulation. In cables and wires, the alcoholates can be added to the insulating layer proper as well as to the field-limiting layers i.e., to the inner and/or outer conducting layer. *) The additives can be present in one layer or in all layers. Preferably, the share of the additives is approximately 0.1 to 5% be weight. Preferably, aluminum alcoholates are used.

*) The inner conducting layer thereby surrounds the electrical conductor, and the insulating layer is situated between the inner and the outer conducting layer.

The invention will be explained in greater detail with the aid of the following example.

EXAMPLE

For demonstrating the decrease of the formation of water trees, plates 3 mm thick were made from high-purity unstabilized thermoplastic polyethylene of low density (L DPE) with and without additive. For producing insulation according to the invention, alcoholates with different concentrations were homogeneously mixed into part of the plate material before being pressed. The plate-shaped test pieces were then stressed electrically with about 10 kV/50 Hz, where both surfaces were in direct contact with a 3% sodium chloride solution heated to 70° C. The duration of the stress was 130 hours.

The test results show that the alcoholate-containing plate specimens contain, under the same test conditions, fewer or no ECT structures as compared with the test pieces without alcoholate addition. Furthermore, a considerable difference in the size of the ECT structures is obtained. For, while the length dimension of the ECT structure in the direction of the electric field is up to 1500 um for the test pieces without alcoholate addition, the alcoholate-containing test pieces show ECT structures below 500 um.

In detail, the following is obtained, for example, for addition of 0.5 to 1%:

| Additive | Length of the ECT Structures | Relative Number of ECT Structures (relative to the Reference Test) |
|---|---|---|
| (Reference Test) | $\leq$ 1500 um | — |
| Al (i-OC$_3$H$_7$)$_3$ | $\leq$ 500 um | Much less |
| Al (sec-OC$_4$H$_9$)$_3$ | — | None |

It is thus found that the ECT formation can be reduced considerably with small alcoholate concentrations. This has the further advantage that the electrical properties of the insulation are not influenced or only insignificantly so.

What is claimed is:

1. An insulated electrical conductor comprising an electrically conducting material in combination with an electrically insulating polyolefin composition containing at least one alcoholate of magnesium, calcium or aluminum as an additive thereto, said additive acting upon said polyolefin composition to prevent the formation of water trees when said composition is dielectrically stressed by the presence of an electric field.

2. An insulated electrical conductor according to claim 1 wherein the alcoholate has the formula M(OR)$_x$, M is magnesium, calcium or aluminum; x is 2 when M is magnesium or calcium, x is 3 when M is aluminum; and R is an alkyl of 1 to 24 carbon, cycloalkyl or alkaryl.

3. A conductor according to claim 1 wherein the concentration of the additive is about 0.05 to about 10% by weight relative to the total weight of the composition.

4. A conductor according to claim 3 wherein the additive concentration is 0.1% to about 5%.